United States Patent Office 2,957,027
Patented Oct. 18, 1960

2,957,027

PREPARATION OF PSEUDO ISOMETHYL IONONE

Muus G. J. Beets and Harm Van Essen, both of Hilversum, Netherlands, assignors, by mesne assignments, to Polak & Schwarz International N.V., a corporation of the Netherlands No Drawing. Filed Sept. 10, 1957, Ser. No. 683,006

Claims priority, application Great Britain Sept. 11, 1956

6 Claims. (Cl. 260—593)

Condensation of citral with butanone may theoretically lead to the formation of two isomers. If the aldehyde group of citral reacts with the methyl group of butanone, pseudo normal methyl ionone (I) is obtained whereas reaction with the methylene group will lead to the formation of pseudo isomethyl ionone (II).

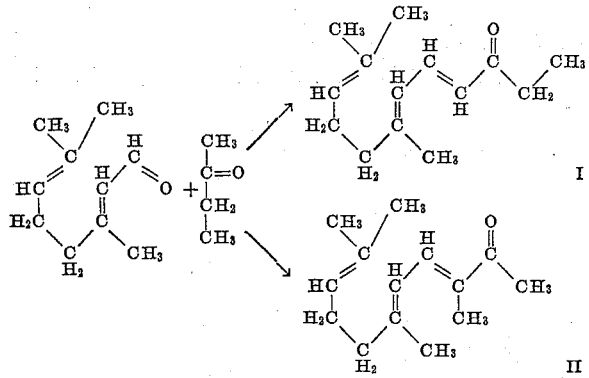

Both compounds have been described previously and it is known that each of them can be converted by the action of acids or of Lewis-acids into the corresponding methyl ionones, i.e. I into α-normal methyl ionone or β-normal methyl ionone and II into α-isomethyl ionone or β-isomethyl ionone.

These four isomeric methyl ionones have been studied by Haarmann and Reimer (German Patent 150,825), Köster (Journal für praktische Chemie [2], 143, 249 (1935)) and by Pope and Bogert (Journal of Organic Chemistry 2, 279 (1937)).

The only unambiguous synthesis of pseudo isomethyl ionone has been described by Cherbuliez and Hegar (Helv. Chim. Acta 15, 199 (1932)) who condensed citral with the Grignard-compound of 3-bromo-butanone but, although this method was much improved by Beets (Rec. trav. chim. 69, 307 (1950)), it is too cumbersome to be of practical use.

It is an object of the present invention to provide a new and simple method for the condensation of citral with butanone by means of which pseudo isomethyl ionone or mixtures containing the same can be prepared.

According to this method, the condensation of citral and methylethyl-ketone (butanone) is carried out in the presence of condensation agents consisting of:

(1) A completely alkylated organic cation, such as a quaternary ammonium ion, and (2) A strongly basic anionic component, such as hydroxide or methoxide.

The expression "completely alkylated" is used here in its widest sense and means that all valencies of the central atom of the cation are occupied by substituted or unsubstituted hydrocarbon groups.

Very high yields of pseudo isomethyl ionone are obtained when completely alkylated organic cations are used. Although this yield may vary widely depending on the nature and the amount of condensation agent added, the medium and the reaction conditions, reaction products consisting mainly of pseudo isomethyl ionone can easily be obtained. Although other organic cations such as quaternary phosphonium, arsonium and stibonium ions or tertiary sulfonium ions can be used in the present invention, they are less easily available and it is preferred to make use of quaternary ammonium ions such as tetramethyl ammonium, tetraethyl ammonium, trimethyl benzyl ammonium, triethyl benzyl ammonium, trimethyl phenyl ammonium, trimethyl myristyl ammonium, benzyl pyridinium, ethyl quinolinium, diisobutyl cresoxy ethoxy ethyl, dimethyl benzyl ammonium, etc., because they are either cheap and easily available or they may be prepared in a simple way, if desired, in situ from cheap materials.

The anion, the amount of which is not necessarily equivalent to that of the cation, is chosen from the group of strongly basic anions. Hydroxides or alcoholates are preferably used, but satisfactory results are obtained also with other strongly alkaline anions, such as cyanide or phenolate. Weakly basic anions, such as halides and acetates, are inactive.

The yield of condensation product and the percentage of pseudo isomethyl ionone are influenced by the amount of condensation agent if other factors are kept constant but under suitable conditions practical results may be obtained in the presence of widely varying amounts of condensation agent, e.g. 0.033 mole to 2.0 moles per mole of citral. Reasonable yields may be obtained by reacting citral and methylethylketone in equivalent amounts bu the yield is generally increased if the latter is used in excess.

The condensation reaction according to the present invention preferably is carried out in such a medium that it can take place as a homogeneous reaction, i.e. that both reactants and both ionic constituents of the condensation agent are dissolved in the same phase in a concentration which is sufficiently high to allow the reaction to take place at a practical rate. Very favorable media in this respect are lower aliphatic alcohols, such as methanol and ethanol but practical results may be obtained also in other media, such as ethyl butyl ether, pyridine and benzylalcohol.

The molar proportion of methylethylketone to citral may be as high as 8:1 or even higher.

The reaction is preferably carried out in the absence of water or in the presence of only small amounts of water but, although the presence of considerable amounts of water generally decreases the percentage of pseudo isomethyl ionone in the condensation product, practical yields of the desired component can be obtained in the presence of high amounts of water, e.g. in a medium consisting of 50% of water and 50% of methanol.

The temperature is not critical. Very favorable results are obtained when the condensation is carried out at increased temperature, e.g. between 50° C. and the boiling point of the reaction mixture, but pseudo isomethyl ionone may also be obtained in satisfactory yields at lower temperatures as long as the reaction takes place at a practical rate.

The pressure is not critical either, as shown by the fact that substantially the same results were obtained when the process was carried out in an autoclave in which a pressure up to 100 atm. is maintained by means of an inert gas such as nitrogen, instead of effecting the process under atmospheric pressure.

The condensation agents used according to the present invention may be obtained in various ways of which are mentioned by way of example:

(1) Some quaternary ammonium hydroxides are commercially available in concentrated aqueous solution and such products may be used as such.

(2) Several quaternary ammonium salts are commercially available and such products may be converted into the hydroxides, alcoholates, cyanides, etc. by adding a suitable source of anions such as moist silver oxide, alkali hydroxides, alkali alcoholates or alkali cyanides to a solution of the salt in a suitable solvent, such as water, alcohols, pyridine, etc.

(3) A large variety of quaternary and, for sulfur compounds, tertiary salts can be prepared by treating tertiary amines, phosphines, arsines or stibines or a secondary sulfide with an alkyl, aryl or aralkyl halide, e.g. triethyl amine with benzyl chloride, triethyl phosphine with benzyl chloride, triphenyl arsine with methyliodide or methyl benzyl sulfide with butyl iodide. Such reactions may be conveniently carried out in the apparatus and in the medium in which the condensation reaction is to be carried out and the basic anion may be introduced into the same medium in the form of potassium hydroxide, sodium methoxide, etc. This procedure may be preferred because it reduces the whole process consisting of the preparation of the condensation agent from simple and cheap materials and the condensation of citral with methylethylketone to one practical step.

The quality of the citral used as starting material for the process according to the present invention is of little consequence. Completely purified citral, either synthetic or from natural sources, may be used. Satisfactory results can be obtained also with cruder forms of citral, such as lemongrass oil, crudely distilled lemongrass oil or fractionated lemongrass oil. In most of the examples, a pratical quality of citral, containing about 90% of the aldehyde, prepared by normal fractionation of lemongrass oil was used.

The mixture of pseudo isomethyl ionone and pesudo normal methyl ionone obtained according to the present invention and usually consisting mainly of the former isomer, may be converted by means of well known cyclization techniques into the corresponding α-methyl ionones or into the corresponding β-methyl ionones.

Such cyclization products may be either used as such or the α-isomethyl ionone (or the β-isomethyl ionone, as the case may be) may be purified and separated from normal methyl ionone present by fractional distillation or by other techniques. It is also possible to separate the two isomeric pseudo compounds and to convert pseudo isomethyl ionone into its cyclization products separately.

It is difficult to determine the percentage of pseudo isomethyl ionone in admixture with pseudo normal methyl ionone. As a practical and simple approach to this problem the condensation product may be converted into a mixture of α-methyl ionones, e.g. by means of phosphoric acid or boron fluoride.

As the semicarbazone of α-isomethyl ionone is characterized by its high melting point and low solubility, it can be selectively precipitated and this technique, provided it is carried out in a standardized way, has shown to have a reasonable accuracy.

Although it does not give the exact values, which can only be determined by a cumbersome fractional distillation on a powerful column, experience has taught that there is a reasonable correlation between the percentage determined according to this method and the real value, the former being generally somewhat higher than the latter.

Whenever percentages of pseudo isomethyl ionone in condensation products are mentioned in the examples, it is understood that they have been determined by semicarbazone analysis of the cyclization mixture and, consequently, that changes in the composition of the mixture of pseudo compounds due to its conversion into a mixture of cyclization products have been neglected.

The striking similarity between the course of acid catalyzed aldol condensations and the new type of aldol condensation described here when applied to the condensation of butanone with aldehydes seems to justify the assumption that the solvated proton in the former and the cation in the latter act according to the same mechanism. This is probably characterized by the formation of the energetically most favored of the two possible enol forms of butanone followed by condensation with the aldehyde in a second step, e.g. according to a mechanism of the type proposed by Beets and Heeringa for acid catalyzed reactions (Rec. trav. chim. 74, 1094, note 8 (1955)).

As the conventional alkali catalyzed condensations described in the literature, which are known to be controlled mainly by steric accessibility of the different positions of the ketones by the anion of the catalyst, will in most cases cause condensation of aldehydes with methylthylketone at the methyl position and as the only way known to the art to realize the aldol condensation at the methylene group of butanone, i.e. in the presence of acid, is unsuitable for unstable aldehydes, the new type of cation catalyzed aldol condensations described here may be considered as a new and unique method for the condensation of aldehydes which are unstable in the presence of acid, with butanone at the methylene group.

The following examples are given for the purpose of illustrating the invention. It will be understood that such examples are not intended to limit the scope of the invention.

*Example 1*

10 g. of potassium hydroxide were dissolved in 1200 g. of absolute ethanol. 67.3 g. of trimethyl myristyl ammonium bromide (cont. about 90%) were added at 20° C.

The mixture was heated to 65° C. and at this temperature a mixture of 507 g. of citral 90% and 648 g. of methylethylketone was added in 5 minutes.

Stirring was continued for 5 minutes and after acidification with acetic acid the reaction mixture was worked up and distilled. 235 g. of pseudo methyl ionone; i.e. 38% of theoretical were obtained.

Cyclization with 85% phosphoric acid gave α-methyl ionone in a yield of 81.7% of theoretical, containing, according to the semicarbazone test, 58% of α-isomethylionone.

Substantially the same results were obtained when effecting the process in an autoclave in which a pressure was maintained of 10 or 100 atm., respectively, by means of nitrogen.

*Example 2*

The same experiment was carried out in the presence of 30 g. of potassium hydroxide and 202.5 g. of trimethyl myristyl ammonium bromide. Pseudo methyl ionone was obtained in a yield of 43.1%. After cyclization 80.3% of α-methyl ionone containing 56% of α-isomethylionone were obtained.

*Example 3*

14 g. of potassium hydroxide were dissolved in 1200 g. of absolute ethanol. 121.3 g. (0.26 mole) of 1'-1'-3'-3'-tetramethyl - butyl - 1 (phenoxy - ethoxyethyl) - dimethyl-benzyl-ammonium-chloride monohydrate were added. The mixture was heated at 65° C. and a mixture of 507 g. of 90% citral (3 moles) and 648 g. of methylethylketone was added in 5 minutes. After stirring for 5 minutes, acidification and working up, the reaction product was distilled yielding 281 g. or 45.4% of theoretical of pseudo methyl ionone. Cyclization gave 85% of α-methyl ionone containing 62.0% of α-isomethyl ionone according to the semicarbazone test.

The experiment was repeated twice at the same scale with different amounts of quaternary chloride and potassium hydroxide.

With 244.6 g. of the quaternary chloride (0.525 mole) and 28 g. of potassium hydroxide 33% of condensation product was obtained. Cyclization gave 80% of α-methyl ionone containing 67.7% of α-isomethyl ionone.

When 81.5 g. (0.175 mole) of chloride and 9.3 g. of potassium hydroxide were used, these data were 43.6%; 82.4% and 56.2%.

Example 4

A mixture of 850 g. of 90% citral and 720 g. of methylethylketone was added in 10 minutes at 65–67° C. to a mixture of 2000 g. of absolute ethanol, 252 g. of a 60% aqueous solution of trimethyl benzyl ammonium hydroxide and 360 g. of methylethylketone.

Stirring was continued for 5 minutes and the reaction mixture was acidified and worked up.

Yield condensation 47.2%. Yield cyclization 85.8%. Semicarbazone test 55%.

Comparable yields were obtained when an equivalent amount of trimethyl phenyl ammonium hydroxide was used.

Example 5

A mixture of 101 g. (0.8 mole) of benzyl chloride, 89 g. of triethyl amine and 26 g. of methanol was refluxed for 40 minutes.

800 g. of benzyl alcohol, 40 g. of potassium hydroxide and 432 g. of methylethylketone were added.

338 g. (2 moles) of 90% citral were introduced at 67° C. in 20 minutes. Stirring was continued for 10 minutes and the reaction product was worked up in the usual way. Yield: 37%. Yield cyclization: 79%. Semicarbazone test: 78.0% of α-isomethyl ionone. A similar result was obtained when 61.5 g. of allyl chloride was used instead of benzyl chloride.

Example 6

A mixture of 126.5 g. of benzyl chloride (1 mole), 101 g. of triethyl amine (1 mol) and 46 g. of absolute ethanol was refluxed for 1½ hours. 1954 g. of absolute ethanol and 360 g. of methylethylketone were added, followed by 50 g. of potassium hydroxide.

The mixture was heated to 65° C. and 845 g. of citral 90% and 720 g. of methylethylketone were introduced at 65–67° C. in 10 minutes.

After 5 minutes the condensation product was worked up. Yield: 50.0%. Yield cyclization 87.6%. The semicarbazone test indicated the presence of 64.6% of α-isomethyl ionone.

The same experiment was repeated with the only difference that triethyl amine and benzyl chloride were omitted. The yields of condensation and cyclization were about the same. The cyclization product contained 36.7% of α-isomethyl ionone according to the semicarbazone test. Replacement of potassium hydroxide by the equivalent amount of sodium hydroxide in the first experiment had practically no influence. Replacement of absolute ethanol by 95% ethanol in the first experiment had no influence.

Example 7

360 g. of methylethylketone and a solution of 30 g. of sodium in 500 g. of absolute ethanol were added to a solution of 1 mole of triethyl benzyl ammonium chloride in 1500 g. of absolute ethanol.

A mixture of 720 g. of methylethyl-ketone and 845 g. of citral 90% was introduced in 10 minutes at 67° C. Stirring was continued for 5 minutes and the reaction product was worked up. After cyclization the semicarbazone test indicated the presence of 60% of α-isomethyl ionone. Replacement of the benzyl group in the catalyst by a chloro benzyl group or replacement of the ethoxy anion by equivalent amounts of methoxy or benzyloxy had little influence upon this result.

Example 8

To a solution of 0.66 mole of triethyl benzyl ammonium hydroxide in 2000 g. of absolute ethanol were added 1080 g. (15 moles) of methylethylketone.

845 g. of 90% citral (5 moles) were introduced at 65–67° C. in 20 minutes. Stirring was continued for 10 minutes and the reaction mixture was acidified with acetic acid. Alcohol and methylethylketone were removed by distillation, benzene was added and the benzenic solution washed to neutral reaction. Benzene was distilled off and the residue quickly distilled in vacuum without the use of a column. Distillate 715 g. (B.P.$_3$ mm. 50–200° C.). Residue 355 g.

Fractionation of the distillate yielded 544 g. of pseudo methyl ionone or 52.7% of the theoretical yield. After cyclization with phosphoric acid 86.5% of α-methyl ionone, containing 65.0% of α-isomethyl ionone according to the semicarbazone test was obtained.

When the same experiment was repeated in the presence of 2.00 moles of triethyl benzyl ammonium hydroxide, 43% of condensation product were obtained. Cyclization gave 83% of α-methyl ionone containing 80.2% of α-isomethyl ionone.

Further increase of the amount of catalyst to 5.00 moles diminished the yield of condensation product but the cyclization product still contained over 80% of α-isomethyl ionone according to the semicarbazone test.

A decrease of the amount of methylethylketone to 5 moles led to a considerable decrease of the yield. The α-isomethyl ionone content of the cyclization product, however, was little affected.

Example 9

101 g. of benzyl chloride, 88.8 g. of triethyl amine and 32 g. of methanol were refluxed for 1 hour 30 minutes.

800 g. of pyridine, 40 g. of potassium hydroxide and 432 g. of methylethylketone were added. The mixture was heated to 65° C. and 340 g. (2 moles) of 90% citral were added in 20 minutes. Stirring was continued for 10 minutes and the reaction product worked up in the usual way. After cyclization the α-methyl ionone obtained contained 77.7% of α-isomethyl ionone according to the semicarbazone test.

Substantially the same results were obtained when effecting the process in an autoclave in which a pressure was maintained of 10 or 100 atm., respectively, by means of nitrogen.

Example 10

50.6 g. of benzyl chloride, 44.5 g. of triethyl amine and 13 g. of methanol were refluxed for 1½ hours.

800 g. of dry ethyl butyl ether, 20.2 g. of potassium hydroxide and 432 g. of methylethylketone were added.

340 g. (2 moles) of 90% citral were introduced at 65–67° C. in 13 minutes. After 5 minutes the reaction mixture was worked up. Yield 31%.

After cyclization, α-methyl ionone containing 38% of α-isomethyl ionone was obtained in 80% yield.

Example 11

To a solution of 0.45 mole of triethyl benzyl ammonium hydroxide in 2000 g. of isopropanol were added 360 g. of methylethylketone. The solution was heated to 65° C. and at 65–67° C. a mixture of 720 g. of methylethylketone and 845 g. of 90% citral were introduced in 10 minutes.

Stirring was continued for 5 minutes and the reaction mixture was worked up in the usual way. 410 g. (40% of the theory) of pseudo methyl ionone were obtained. Cyclization with phosphoric acid yield 87.4% of α-methyl ionone containing 58.5% of α-isomethyl ionone.

The experiment was repeated with 0.3 mole of condensation agent. Yield 45.7%. Cyclization yielded 85.8% of α-methyl ionone containing 44% of α-isomethyl ionone.

The same experiment carried out in the presence of 1 mole of condensation agent yielded 30% of pseudo methyl ionone. After cyclization, α-methyl ionone, containing 73.0% of α-isomethyl ionone, was obtained in 84% yield.

Example 12

To a solution of 0.2 mole of triethyl benzyl phosphonium hydroxide in 400 g. of methanol were added 216 g. (3 moles) of methylethylketone. 169 g. (1 mole) of 90% citral was introduced at 66° C. in 20 minutes. After stirring for 15 minutes at the same temperature, the reaction mixture was acidified and worked up.

Pseudo methyl ionone was obtained in a yield of 32% of theoretical. After cyclization with phosphoric acid the reaction product was converted into α-methyl ionone containing 56.3% of α-isomethyl ionone according to the semicarbazone test.

Example 13

A mixture of 50 g. of benzyl chloride (0.4 mole), 44 g. of triethyl amine and 13 g. of methanol was refluxed for 1½ hours. 800 g. of methanol, 26 g. (0.4 mole) of potassium cyanide and 432 g. of methylethylketone were added. 340 g. (2 moles) of citral 90% were introduced at reflux temperature in 30 minutes. After ½ hour at the same temperature the reaction mixture was worked up.

Yield 45% of condensation product, yielding 80% of cyclization product after cyclization with phosphoric acid. This contained 61% of a α-isomethyl ionone according to the semicarbazone test.

Example 14

379.5 g. of benzyl chloride (3 moles), 333.3 g. of triethyl amine (3.3 moles) and 96 g. of methanol were refluxed for 1 hour and 50 minutes. 1504 g. of methanol, 150 g. of potassium hydroxide and 864 g. of methylethylketone were added and the mixture was heated to reflux. At this temperature 680 g. (4 moles) of citral were introduced in 20 minutes and stirring and boiling were continued for 10 minutes.

After acidification with acetic acid and removal of methanol and methylethylketone, the reaction product was taken up in benzene, washed and distilled. Yield 416 g. or 50.5% of theoretrical. Cyclization gave 85.8% of α-methyl ionone containing 82.0% of α-isomethyl ionone according to the semicarbazone test. Determination of the α-isomethyl ionone content of the cyclization product by fractionation by means of a 16-plate column gave 74%.

When the same experiment was carried out with 202 g. of benzyl chloride, 178 g. of triethyl amine and 80 g. of potassium hydroxide, the yield was 60%. Cyclization gave 88.6% of α-methyl ionone containing 69.1% of α-isomethyl ionone according to the semicarbazone test. Determination by fractionation through a 16-plate column gave 65.3% of α-isomethyl ionone.

With 304 g. of benzyl chloride, 266.6 g. of triethyl amine and 120 g. of potassium hydroxide pseudo methyl ionone was obtained in 57% yield. Cyclization gave 87.5% of α-methyl ionone containing 75.8% of α-isomethyl ionone (semicarbazone test).

The second of the three experiments was repeated using a mixture of equal parts by weight of methanol and water instead of pure methanol. The condensation product was obtained in a yield of 53.2%.

Cyclization gave 84% of α-methyl ionone containing 55.0% of α-isomethyl ionone (semicarbazone test).

Example 15

The condensation agent was prepared from 253 g. of benzyl chloride, 222 g. of triethyl amine and 100 g. of potassium hydroxide in 2000 g. of methanol. 432 g. of methylethylketone were added.

340 g. of citral 90% (2 moles) were introduced at the boiling point in 20 minutes.

After stirring for 10 minutes more the reaction product was worked up.

Pseudo methyl ionon was obtained in 57% yield. Cyclization gave 85% of α-methyl ionone containing 76.2% of α-isomethyl ionone (semicarbazone test).

Example 16

To a solution of 0.4 mole of triethyl benzyl ammonium hydroxide in 813 g. of methanol were added 432 g. of methylethylketone.

340 g. of citral 90% were introduced in 30 minutes at 33–36° C. and stirring was continued for 30 minutes. Yield 30%. Cyclization gave 80% of α-methyl ionone containing 77.2% of α-isomethyl ionone (semicarbazone test).

Example 17

To 546 g. (2.4 moles) of triethyl benzyl ammonium chloride and 1600 g. of methanol were added 0.72 mole of potassium hydroxide and 864 g. (12 moles) of methylethylketone.

680 g. (4 moles) of 90% citral were introduced in 20 minutes at reflux temperature. Stirring was continued for 20 minutes and the reaction mixture was worked up. Pseudo methyl ionone, B.P. 120–149° C. at 3 mm. $n_D^{20}$ 1.5180–1.5290 was obtained in a yield of 53.2%. Carbonyl assay by oximation 99.9%. Cyclization yielded 86.7% of α-methyl ionone containing 67.3% of α-isomethyl ionone according to the semicarbazone test.

Example 18

1234 g. of methylethylketone were added to a solution of 0.4 mole of triethyl benzyl ammonium hydroxide in 45 g. of water. The mixture was heated to 65° C. and 340 g. (2 moles) of citral (about 90%) were added in 20 minutes at 65–67° C. After stirring for 10 minutes at the same temperature acetic acid was added and the reaction product was worked up. Pseudo methyl ionone was obtained in 32% yield (carbonyl assay 4.90 m./eq./g. or 99.7%). Cyclization with phosphoric acid yielded 80% of α-methyl ionone containing 36% of α-isomethyl ionone according to the semicarbazone test.

Example 19—Semicarbazone test 7 g. of semicarbazide hydrochloride were dissolved in 50 cc. 20% sodium acetate solution.

10 g. of α-isomethyl ionone containing product were added.

The liquid was stirred and ethanol was introduced until the liquid became just clear. The mixture was left 4 hours at room temperature and 20 hours at 0° C. The semicarbazone was separated by filtration and washed with 10 cc. of cold ethanol.

The washed semicarbazone was stirred with 500 cc. of water at 35° C. for ¾ hour, filtered by suction and dried in vacuum until the weight had reached a constant value. The semicarbazone obtained in this way was not pure but it showed a fairly reproducible melting point of 188° C. and higher.

Example 20

51.2 g. (0.36 mole) of methyl iodide, 24.8 g. (0.4 mole) of dimethylsulfide and 13 g. of methanol were placed in a reaction apparatus. The mixture was heated for several hours on a steam bath until tthe reaction was complete.

A solution of 17.5 g. of potassium hydroxide in 387 g. of methanol was added followed by 216 g. (3 moles) of methylethylketone.

After heating to 65° C., 170 g. (1 mole) of citral 90% were introduced under reflux in 20 minutes.

Stirring and refluxing were continued for 10 minutes and the reaction mixture was acidified and worked up.

The crude product was quickly distilled in vacuo product using a column (155 g. of distillate) and the distillate fractionated. Pseudo methyl ionone ($n_D^{20}$ 1.5220–1.5290) was obtained in a yield of 58.2% of the theory.

Cyclization with phosphoric acid yielded 80.5% of

α-methyl ionone containing 59.5% of α-isomethyl ionone according to the semicarbazone test.

Example 21

2 moles of triethyl benzyl ammonum hydroxide and 1400 g. of methanol were heated to 70° C.

756 g. (10.5 moles) of methylethylketone were added.

The mixture was stirred and, while the temperature was maintaned at 67–70° C., 710 g. of lemongrass oil (citral cont. ca. 75%) were added in 20 minutes. Stirring was continued for 10 minutes at the same temperature.

130 g. of acetic acid were added and the reaction product was worked up. 360 g. of pseudo methyl ionone or 50% of theoretical were obtained.

Cyclization with phosphoric acid yielded α-methyl ionone containing, according to the semicarbazone test, 76.4% of α-isomethyl ionone.

Example 22

170 g. of citral 90%, 360 g. of methylethylketone, 320 g. of absolute ethanol and 50 g. of I.R.A.–400 (an ion exchange material, the active groups of which consist of quaternary ammonium hydroxide functions) were refluxed for 7 hours. Pseudo methyl ionone was obtained in a yield of 55% of the theory.

After cyclization with phosphoric acid α-methyl ionone was obtained in 82.3% yield. Content by oximation 96.4%. Content of α-isomethyl ionone, according to the semicarbazone test, 33%.

Example 23

132 g. (1.05 moles) of dimethyl sulfate were added in ¼ hour to a mixture of 104 g. (1.32 moles) of dry pyridine and 10 g. of methanol.

After the vigorous reaction had subsided, stirring was continued for ¾ hour at 80° C. and the mixture cooled.

800 g. of methanol and 460 g. of potassium hydroxide were added. Stirring was continued for 5 minutes. 432 g. of butanone were added and the mixture heated to 65° C.

In 20 minutes 340 g. of citral 90% were added at the same temperature, stirring was continued for 15 minutes and the reaction product was worked up.

171 g. of pseudo methyl ionone or 41.5% of theoretical were obtained. After cyclization, 80% of α-methyl ionone containing 75% of α-isomethyl ionone, according to the semicarbazone test were obtained.

Similar results were obtained when the equivalent amount of quinoline was used instead of pyridine.

Example 24

A solution of 1 mole of sodium phenolate in 760 g. of absolute methanol was added to a mixture of 1.2 moles of triethyl benzyl ammonium chloride and 38 g. of methanol.

The mixture was stirred at 50° C. for 10 minutes and 432 g. (6 moles) of butanone were added.

The temperature was increased to 65° C. and 340 g. (2 moles) of 90% citral were added at this temperature in 15 minutes.

Stirring was continued at the same temperature for 30 minutes and the reaction product was acidified with acetic acid and worked up.

131 g. (31.7% of theoretical) of pseudo methyl ionone were obtained and 65 g. of citral were recovered. After cyclization, α-methyl ionone, containing 49% of iso component according to the semicarbazone test were obtained.

Example 25

A mixture of 152 g. (1.2 moles) of benzyl chloride, 133 g. (1.32 moles) of triethyl amine and 38 g. (1.2 moles) of methanol was heated at 110° C. for ½ hour.

760 g. of methanol and 60 g. (1.1 moles) of potassium hydroxide were added, the mixture stirred at 50–70° C. for 15 minutes and cooled down to 0° C.

Hereafter 432 g. of methylethylketone (6 moles) and 340 g. (2 moles) of citral 90% were added in ¾ hour. Stirring was continued at 0°–4° C. for 1½ hours and after acidification with acetic acid the reaction product was worked up and fractionated. The pseudo methyl ionone obtained in this way was impure and after cyclization with phosphoric acid α-methyl ionone was obtained in moderate yield, containing according to the semicarbazone test, about 20–25% of α-isomethyl ionone.

Example 26

7.0 g. of potassium metal were dissolved in 400 g. of dry ethanol.

A mixture of 170 g. of 90% citral and 215 g. of methylethylketone was added at 65° C. in 10 minutes.

Stirring was continued for 5 minutes and the reaction product was acidified and worked up. After distillation 93 g. or 45% of peudo methyl ionone were obtained. Cyclization yielded 85% of α-methyl ionone containing, according to the semicarbazone test, 37% of α-isomethyl ionone.

What is claimed is:

1. A process for the preparation of pseudo isomethyl ionone which comprises condensing citral and butanone in a reaction medium having dissolved therein a condensation agent, said condensation agent having an organic cation selected from the class consisting of quaternary ammonium, quaternary phosphonium and tertiary sulphonium and a strongly basic anionic component.

2. A process according to claim 1 wherein said reaction medium is a lower aliphatic alcohol.

3. A process according to claim 1 wherein the molar ratio of butanone to citral employed is greater than 1.

4. A process according to claim 1 wherein the condensation is carried out at about between 50° C. and the boiling point of the reaction mixture.

5. A process according to claim 1 wherein the condensation agent is employed in amounts of from .033 mole to 2.0 moles per mole of citral employed.

6. A process for the preparation of pseudo isomethyl ionone which comprises condensing citral and butanone in a reaction medium having dissolved therein from .033 mole to 2.0 moles per mole of citral of a condensation agent, said condensation agent having an organic cation selected from the class consisting of quaternary ammonium, quaternary phosphonium and tertiary sulphonium and a strongly basic anionic component selected from the class consisting of hydroxy, alkoxy, phenoxy and cyanide, said condensation being carried out at a temperature of about between 50° C. and the boiling point of the reaction mixture, the molar ratio of butanone to citral employed being greater than 1.

References Cited in the file of this patent

Landau et al.: J. Org. Chem., vol. 12, pages 422–425 (1947).

West et al.: Synthetic Perfumes, pages 169–172; 175–177 (1949).

Astle et al.: Ind. and Eng. Chem., vol. 44, pages 2869–71 (1952).